US009354688B2

(12) United States Patent
Furubayashi

(10) Patent No.: US 9,354,688 B2
(45) Date of Patent: May 31, 2016

(54) IMAGE FORMING APPARATUS AND PRINT SYSTEM

(75) Inventor: Toshiya Furubayashi, Takarazuka (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 957 days.

(21) Appl. No.: 13/311,745

(22) Filed: Dec. 6, 2011

(65) Prior Publication Data
US 2012/0159223 A1   Jun. 21, 2012

(30) Foreign Application Priority Data
Dec. 20, 2010   (JP) .................. 2010-282623

(51) Int. Cl.
| G06F 1/32 | (2006.01) |
| G03G 15/00 | (2006.01) |
| H04N 1/00 | (2006.01) |
| G06F 3/12 | (2006.01) |
| G06K 15/00 | (2006.01) |

(52) U.S. Cl.
CPC .......... *G06F 1/3228* (2013.01); *G03G 15/5004* (2013.01); *G06F 1/32* (2013.01); *G06F 1/3203* (2013.01); *G06F 1/325* (2013.01); *G06F 1/3206* (2013.01); *G06F 1/329* (2013.01); *G06F 1/3209* (2013.01); *G06F 1/3215* (2013.01); *G06F 1/3234* (2013.01); *G06F 1/3246* (2013.01); *G06F 1/3284* (2013.01); *G06F 3/1221* (2013.01); *G06F 3/1229* (2013.01); *G06F 3/1279* (2013.01); *G06K 15/4055* (2013.01); *H04N 1/00896* (2013.01); *Y02B 60/1267* (2013.01); *Y02B 60/1271* (2013.01); *Y02B 60/32* (2013.01)

(58) Field of Classification Search
None
See application file for complete search history.

(56) References Cited

U.S. PATENT DOCUMENTS

| 5,809,369 | A | * | 9/1998 | Furuya et al. ................... 399/70 |
| 6,166,355 | A | * | 12/2000 | Watanabe et al. ............. 219/497 |
| 6,493,100 | B1 | * | 12/2002 | Endo et al. .................... 358/1.14 |
| 6,925,574 | B2 | | 8/2005 | Satoh |
| 7,353,413 | B2 | * | 4/2008 | Dunstan ....................... 713/320 |
| 7,593,661 | B2 | * | 9/2009 | Watanabe et al. .............. 399/88 |
| 8,060,759 | B1 | * | 11/2011 | Arnan et al. .................. 713/300 |

(Continued)

FOREIGN PATENT DOCUMENTS

| GB | 2 366 047 A | * | 2/2002 | ................ G06F 1/32 |
| JP | 2002-300329 A | | 10/2002 | |

(Continued)

*Primary Examiner* — Tanh Nguyen
(74) *Attorney, Agent, or Firm* — Buchanan Ingersoll & Rooney PC

(57) ABSTRACT

An image forming apparatus monitors sleep-cancelling events, and when a sleep-cancelling event occurs, stores an identifier and a sleep-cancellation time of the event. If a start time of a sleep mode is reached when (i) the apparatus is in a standby mode and (ii) one or more sleep-cancelling events specifying sleep-cancellation times later than the start time have been stored, the apparatus calculates power consumption required to maintain the standby mode for a period from the start time to the earliest sleep-cancellation time, as a power-saving amount savable during the period. Also, a recovery power amount required for recovery from the sleep mode to the standby mode is calculated on the assumption that the sleep mode is started at the start time and is cancelled at the earliest sleep-cancellation time. Switching to the sleep mode is performed only when the power-saving amount is greater than the recovery power amount.

6 Claims, 12 Drawing Sheets

(56) References Cited

U.S. PATENT DOCUMENTS

| | | |
|---|---|---|
| 2005/0154934 A1* | 7/2005 | Kim .............................. 713/323 |
| 2006/0018678 A1* | 1/2006 | Sekiguchi et al. ............. 399/70 |
| 2006/0127118 A1* | 6/2006 | Kishi et al. .................... 399/69 |
| 2010/0215391 A1* | 8/2010 | Namiki et al. ................. 399/70 |
| 2010/0257394 A1* | 10/2010 | Koga ............................. 713/324 |
| 2011/0142472 A1* | 6/2011 | Mitsuoka et al. .............. 399/69 |
| 2011/0173474 A1* | 7/2011 | Salsbery et al. ............... 713/323 |
| 2011/0173475 A1* | 7/2011 | Frantz et al. ................... 713/323 |
| 2011/0235133 A1* | 9/2011 | Saiki ............................. 358/474 |
| 2012/0076523 A1* | 3/2012 | Kojima .......................... 399/70 |
| 2012/0159223 A1* | 6/2012 | Furubayashi .................. 713/323 |

FOREIGN PATENT DOCUMENTS

| | | |
|---|---|---|
| JP | 2006-184541 A | 7/2006 |
| JP | 2006-256116 A | 9/2006 |

* cited by examiner

FIG. 4

| Average power consumption (watts) required for maintaining the standby temperature | Environmental temperature (° C) |
|---|---|
| A1 | 5 or lower |
| A2 | 6 ~ 10 |
| A3 | 11 ~ 15 |
| A4 | 16 ~ 20 |
| A5 | 21 ~ 25 |
| A6 | 26 ~ 30 |
| A7 | 31 ~ 35 |
| A8 | > 35 |

FIG. 5

| Time (sec.) elapsed since the start of the sleep mode | Estimated surface temperature (° C) of the fixing roller |
|---|---|
| 1 | 170 |
| 5 | 167.5 |
| 10 | 164.5 |
| 15 | 161.3 |
| ⋮ | ⋮ |
| ⋮ | ⋮ |
| 60 | 130 |
| ⋮ | ⋮ |
| 70 | 120 |
| ⋮ | ⋮ |

FIG. 6

| Power consumption (watts) required for raising the temperature to the standby temperature | Estimated surface temperature (° C) of the fixing roller at the sleep cancellation |
|---|---|
| B1 | < 50 |
| B2 | 50 ~ 69 |
| B3 | 70 ~ 89 |
| B4 | 80 ~ 99 |
| B5 | 90 ~ 109 |
| B6 | 110 ~ 129 |
| B7 | 130 ~ 149 |
| B8 | 150 or higher |

FIG. 7

| Hourly usage history | Total number of prints |
|---|---|
| 8:00 – 8:59 | 0 |
| 9:00 – 9:59 | 57 |
| 10:00 – 10:59 | 87 |
| 11:00 – 11:59 | 6 |
| 12:00 – 12:59 | 5 |
| 13:00 – 13:59 | 34 |
| 14:00 – 14:59 | 45 |
| 15:00 – 15:59 | 21 |
| 16:00 – 16:59 | 12 |
| 17:00 – 17:59 | 3 |
| 18:00 – 18:59 | 45 |
| 19:00 – 19:59 | 146 |
| 20:00 – 20:59 | 78 |

FIG. 8

| Name of scheduled sleep-cancelling event | Cancellation time |
|---|---|
| Time-specified print job 1 | 2011/1/22 17:30 |
| Time-specified print job 1 | 2011/1/22 18:30 |
| Frequent-use period | 2011/1/22 19:00 |
| Time-specified sleep request | 2011/1/22 20:00 |

IMAGE FORMING APPARATUS AND PRINT SYSTEM

CROSS-REFERENCE TO RELATED APPLICATIONS

This application is based on application No. 2010-282623 filed in Japan, the contents of which are hereby incorporated by reference.

BACKGROUND OF THE INVENTION (1) Field of the Invention

The present invention relates to image forming apparatuses such as printers and copiers, and particularly relates to technology for controlling switching to a sleep mode, in which power supply to parts of an image forming apparatus that consume a large amount of power is limited to be a low level or is stopped, in order to reduce the power consumption by the image forming apparatus.

(2) Related Art

Image forming apparatuses, such as printers and copiers, are not always used continuously, and the frequency of use varies according to the time of day. For this reason, image forming apparatuses are generally enabled to switch to a power save mode (i.e. a sleep mode) for a period in which they are not in use, in order to reduce the power consumption during the period. In the sleep mode, power supply to the parts that consume a large amount of power (e.g. an image formation section that includes a fixing device, a photoreceptor, a developer, and the likes) is stopped, and the image forming apparatus in the sleep mode can not perform image formation operations.

As an example of such image forming apparatuses, there is an image forming apparatus that is capable of scheduling switching to the sleep mode so that the image forming apparatus can switch to the sleep mode after completion of a print job (See Japanese Patent Application Publication No. 2006-184541). Due to the scheduling, the image forming apparatus can easily switch to the sleep mode after the completion of a print job. Consequently, the power consumption during a period in which the image forming apparatus is not in use can be reduced.

However, even if it is shortly after the image forming apparatus has switched to the sleep mode, the sleep mode will be cancelled when an event that requests for cancellation of the sleep mode occurs (e.g., in the case where a print job has been scheduled and has been input to the apparatus with designation of a start time of the job). This means that the sleep mode will be canceled before the effect of the sleep mode is fully achieved, and, on the contrary, the power consumption could be increased in some cases due to a warm-up operation, which is performed to return to a standby mode (i.e. a mode in which the apparatus can start an image formation operation immediately), and consumes a certain amount of power.

SUMMARY OF THE INVENTION

One aspect of the present invention is an image forming apparatus comprising: a monitoring part monitoring occurrence of sleep-cancelling events, each sleep-cancelling event requesting cancellation of a sleep mode and recovery to a standby mode and specifying a sleep-cancellation time at which the sleep mode is to be cancelled, the sleep mode being a mode in which an image formation operation is not executable, and the standby mode being a mode in which the image formation operation is executable; a storage part, when a sleep-cancelling event occurs, storing an identifier of the sleep-cancelling event and a sleep-cancellation time specified by the sleep-cancelling event; a calculation part, when (i) a sleep-triggering event specifying a start time at which the sleep mode is to be started occurs while the image forming apparatus is in the standby mode and (ii) one or more sleep-cancelling events specifying sleep-cancellation times later than the start time have been stored in the storage part, calculating an amount of power consumption required to maintain the standby mode for a period from the start time to the earliest one of the sleep-cancellation times, thereby obtaining a power-saving amount savable during the period, and calculating a recovery power amount required for recovery from the sleep mode to the standby mode on an assumption that the sleep mode is started at the start time and is cancelled at the earliest sleep-cancellation time; and a mode controller switching the image forming apparatus to the sleep mode if the power-saving amount is greater than the recovery power amount, and maintaining the standby mode if the power-saving amount is not greater than the recovery power amount.

Another aspect of the present invention is a print system comprising: a terminal device; and an image forming apparatus connected to the terminal device via a network, wherein the image forming apparatus includes: a receiver receiving a sleep request from the terminal device, the sleep request specifying a start time of switching from a standby mode to a sleep mode, the standby mode being a mode in which the image formation operation is executable, and the sleep mode being a mode in which an image formation operation is not executable; a monitoring part monitoring occurrence of sleep-cancelling events, each sleep-cancelling event requesting for cancellation of the sleep mode and recovery to the standby mode; a storage part, when a sleep-cancelling event occurs, storing an identifier of the sleep-cancelling event and a sleep-cancellation time specified by the sleep-cancelling event; a calculation part, when (i) the receiver receives the sleep request while the image forming apparatus is in the standby mode and (ii) one or more sleep-cancelling events specifying sleep-cancellation times later than the start time have been stored in the storage part, calculating an amount of power consumption required to maintain the standby mode for a period from the start time to the earliest one of the sleep-cancellation times, thereby obtaining a power-saving amount savable during the period, and calculating a recovery power amount required for recovery from the sleep mode to the standby mode on an assumption that the sleep mode is started at the start time and is cancelled at the earliest sleep-cancellation time; and a mode controller switching the image forming apparatus to the sleep mode if the power-saving amount is greater than the recovery power amount, and maintaining the standby mode if the power-saving amount is not greater than the recovery power amount.

BRIEF DESCRIPTION OF THE DRAWINGS

These and other objects, advantages and features of the invention will become apparent from the following description thereof taken in conjunction with the accompanying drawings those illustrate a specific embodiment of the invention.

In the drawings:

FIG. 4 is a specific example of an average power consumption table;

FIG. 5 is a specific example of an after-sleep temperature estimation table;

FIG. 6 is a specific example of a temperature-raise power consumption table;

FIG. 7 is a specific example of an hourly usage history table;

FIG. 8 is a specific example of a sleep-cancelling event schedule table;

DESCRIPTION OF PREFERRED EMBODIMENT

1. Structure of Print System

Figure 1:
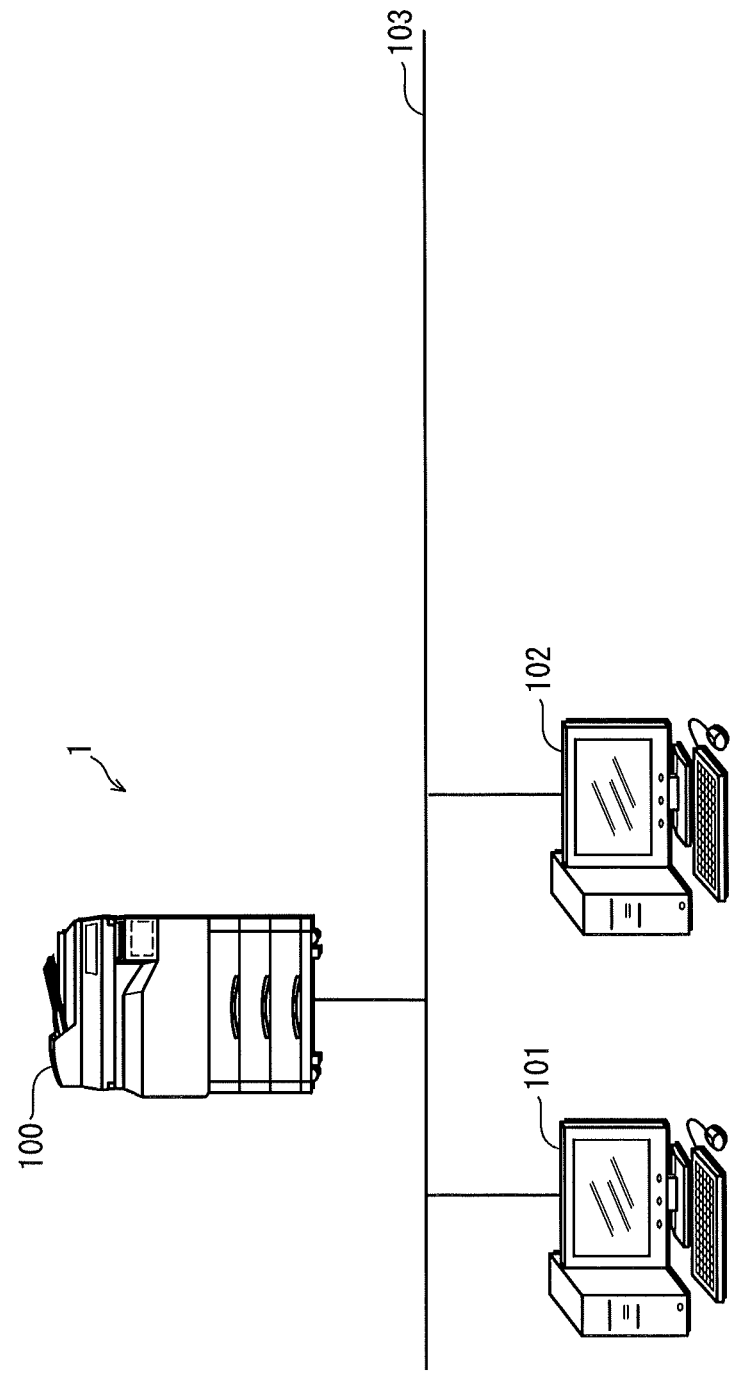
FIG. 1 shows the structure of a print system 1 pertaining to an embodiment of the present invention.

The following describes an embodiment of a print system, which is one aspect of the present invention. FIG. 1 shows the structure of a print system 1 pertaining to an embodiment. As shown in the figure, the print system 1 includes an image forming apparatus 100 (a tandem color digital printer in this description), and terminal devices 101 and 102 each composed of a personal computer (hereinafter referred to as "PC").

The image forming apparatus 100 and the PC 101 and the PC 102 are connected via a network 103 (e.g. LAN (Local Area Network)).

2. Structure of Image Forming Apparatus

Figure 2:
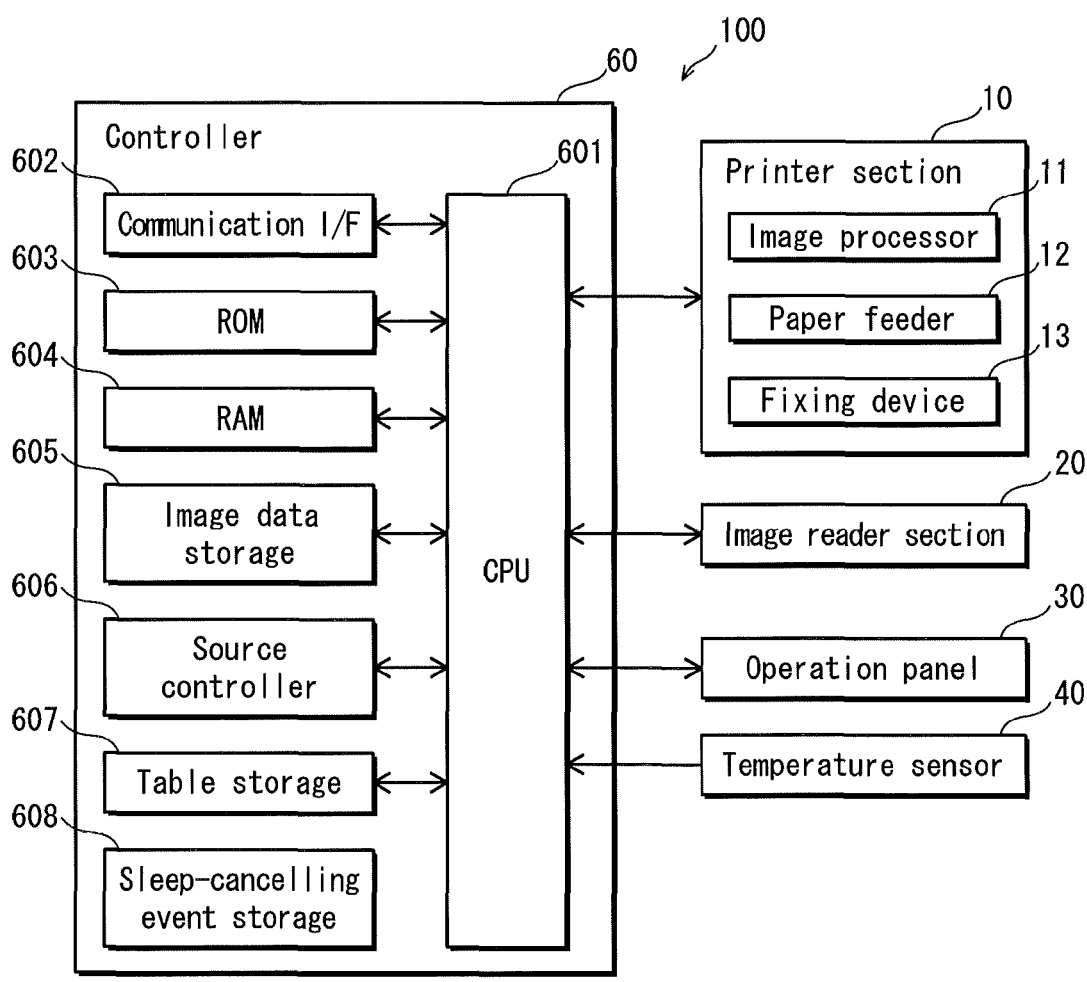
FIG. 2 is a block diagram showing a functional structure of primary components of an image forming apparatus 100.

FIG. 2 is a block diagram showing a functional structure of primary components of the image forming apparatus 100. The image forming apparatus 100 includes, for example, a printer section 10, an image reader section 20, an operation panel 30, a temperature sensor 40 and a controller 60.

The printer section 10 forms, on a recording sheet, a toner image that is based on image data output from the controller 60 by electrophotographic processing. The printer section 10 includes, for example, an image processor 11, a paper feeder 12 and a fixing device 13. The image processor 11 forms a toner image that is based on image data output from the controller 60, and transfers the toner image so formed to a recording sheet supplied from the paper feeder 12. The fixing device 13 includes, for example, a fixing roller and a pressure roller. The fixing device 13 thermally fixes a toner image transferred onto a recording sheet. A temperature sensor (not illustrated) used for the fixing roller is provided near the fixing roller. The temperature sensor detects the temperature of the outer circumferential surface of the fixing roller in the circumferential direction with predetermined time intervals, and outputs the results to the controller 60.

The image reader section 20 reads an image and generates image data, and outputs the generated image to the controller 60. The operation panel 30 includes, for example, a liquid crystal display, a touch panel layered on the liquid crystal panel, and operation buttons for inputting various instructions. The operation panel 30 receives various instructions input by a user operating the touch panel, the operation buttons, and so on. Operation screens, such as a print configuration screen, and various kinds of information are displayed on the liquid crystal display.

The temperature sensor 40 is provided within the image forming apparatus 100. The temperature sensor 40 measures the environmental temperature within the image forming apparatus 100, and outputs the results to the controller 60.

The controller 60 includes, for example, a CPU (Central Processing Unit) 601, an communication interface (I/F) 602, a ROM (Read Only Memory) 603, a RAM (Random Access Memory) 604, an image data storage 605, a power source controller 606, a table storage 607, and a sleep-cancelling event storage 608.

The communication I/F 602 is an interface for connecting to the LAN, such as a LAN card and a LAN board. The ROM 603 stores, for example, programs for controlling the printer section 10, the image reader section 20, the operation panel 30 and the temperature sensor 40, and programs for executing registration of sleep-cancelling events and sleep trigger control, which will be described later.

The RAM 604 is used as a work area when the CPU 601 executes programs. The image data storage 605 stores image data for printing, which has been input from the communication I/F 602 or the image reader section 20. The CPU 601 executes various programs stored in the ROM 603 to control the printer section 10, the image reader section 20, the operation panel 30, the temperature sensor 40, and so on. The CPU 601 also executes the registration of sleep-cancelling events and the sleep trigger control control, which will be described later.

Figure 3:
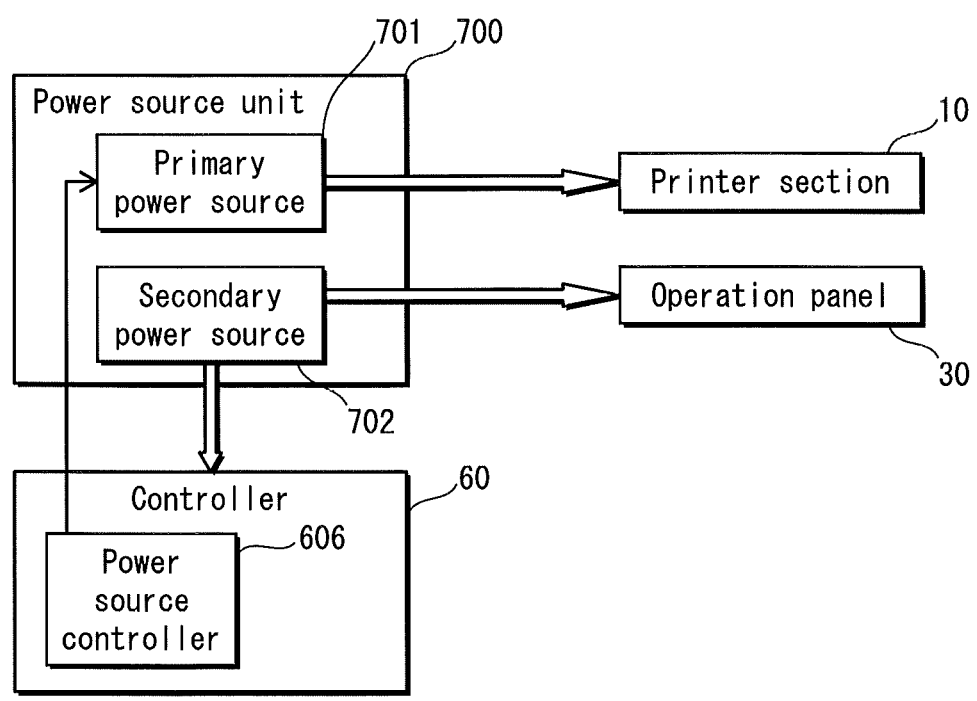
FIG. 3 shows the structure of a power source unit 700, and the relationships 3 between the power source unit 700 and primary components to which power is supplied from the power source unit 700.

The power source controller 606 switches the power supply to the power source unit 700 ON and OFF to switch the power supply to the printer section 10 ON and OFF. The power source unit 700 will be described later. FIG. 3 shows the structure of the power source unit 700, and the relationships between the power source unit 700 and primary components to which power is supplied from the power source unit 700. As shown in the figure, the power source unit 700 includes a primary power source 701 supplying a relatively large amount of electricity, and a secondary power source 702 supplying a relatively small amount of electricity. The primary power source 701 is connected to the printer section 10, and the secondary power source 702 is connected to the operation panel 30 and the controller 60.

The power source controller 606 switches the primary power source 701 ON and OFF to switch the power supply to the printer section 10 ON and OFF. The controller 60 and the operation panel 30 are supplied with electricity from the secondary power source 702. Returning to the description of FIG. 2, the table storage 607 stores an average power consumption table, an after-sleep temperature estimation table, a temperature-raise power consumption table, and so on.

Here, the "average power consumption table" is a table showing the correspondence between the environmental temperature within the image forming apparatus 100 and the average power consumption (watts) per unit time required to maintain the surface temperature of the fixing roller at a standby temperature under the environment at the environmental temperature. The average power consumptions under the environment at their corresponding environmental temperatures have been measured and determined in advance by the manufacturer of the image forming apparatus 100. The term "standby temperature" means a predetermined temperature at which the thermal fixing of a toner image can be performed immediately (e.g. equal to the fixing temperature (approximately 160° C. to 180° C.), or a temperature approximately 10° C. to 20° C. lower than the fixing temperature).

FIG. 4 is a specific example of an average power consumption table; A1-A8 in the drawing denote the values of the average power consumption determined in advance. The average power consumption decreases as the environmental temperature increases (A1>A2>A3>A4>A5>A6>A7>A8). This is because the amount of heat discharged from the fixing roller decreases as the environmental temperature increases. The "after-sleep temperature estimation table" is a table showing the correspondence between the time that has been elapsed since the image forming apparatus 100 switched from the standby mode (in which the surface temperature of the fixing roller is maintained at the standby temperature) to the sleep mode (in which the printer section 10 is not supplied with power) (i.e. the time elapsed since the start of the sleep mode), and the estimated surface temperature of the fixing roller after the aforementioned time has elapsed. The estimated surface temperature is measured and determined in advance by the manufacture of the image forming apparatus 100 under the environment at a predetermined temperature (e.g. 25° C.). Note that plural after-sleep temperature estimation tables may be prepared in correspondence with plural environmental temperatures.

FIG. 5 is a specific example of an after-sleep temperature estimation table; The specific example in the drawing shows the relationships between the time that has been elapsed since the start of the sleep mode and the estimated surface temperature of the fixing roller under the condition where the standby temperature is 170° C. The temperature-raise power consumption table is a table showing the correspondence between the estimated surface temperature of the fixing roller when the sleep mode is cancelled and the power consumption required to raise the surface temperature from the estimated surface temperature to the standby temperature. The aforementioned power consumption at the estimated surface temperature has been measured and determined in advance by the manufacture of the image forming apparatus 100 (For example, the value of the surface temperature is varied within a predetermined range (e.g. 0° C. to 170° C.)., and the aforementioned power consumption is measured for each value of the surface temperature).

FIG. 6 is a specific example of a temperature-raise power consumption table; B1-B8 in the drawing denote the values of the power consumption determined in advance. The power consumption decreases as the estimated surface temperature increases (B1>B2>B3>B4>B5>B6>B7>B8). This is because the difference between the estimated surface temperature and the standby temperature decreases as the estimated surface temperature increases, and accordingly the power consumption required to raise the surface temperature to the standby temperature decreases.

Returning to the description of FIG. 2, the sleep-cancelling event storage 608 stores an hourly usage history table, a sleep-cancelling event schedule table, and a sleep schedule table. Here, the "hourly usage history table" shows the total number of prints output by the image forming apparatus 100 in each predetermined period, over several days (e.g. two days) in the past. The total number of prints in each predetermined period is counted by the controller 60. The total numbers are edited into tables, one table for each day. The tables are stored in the sleep-cancelling event storage 608. The sleep-cancelling event storage 608 stores the tables created in the stated manner for a predetermined number of days (e.g. seven days). When a new table is created after the predetermined number has reached, the oldest table is deleted by the controller 60.

Then, from among the tables stored in the sleep-cancelling event storage 608, tables for a predetermined number of days (e.g. two days) are selected in reverse chronological order. The controller 60 creates the hourly usage history table based on the selected tables. The hourly usage history table is created when the power source unit 700 is powered on. FIG. 7 is a specific example of an hourly usage history table. In the specific example in the drawing, the image forming apparatus 100 is used from 8 A.M. to 9. P.M. The total number of prints is counted every approximately one hour (59 minutes 59 seconds in the example). The table shows, for each period, the total of the numbers that have been counted for a predetermined number of days (e.g. two days).

The "sleep-cancelling event schedule table" is a table showing the correspondence between the identifier of a sleep-cancelling event, which is an event that requests for cancellation of the sleep mode, and a cancellation time at which the sleep mode is requested to be cancelled. Examples of the sleep-cancelling events include a "time-specified print job", "time-specified sleep request", and designation of a frequent-use period. The "time-specified print job" is a print job accompanied by designation of the print start time (i.e. the cancellation time of the sleep mode). The "time-specified sleep request" is a request for switching to the sleep mode accompanied by designation of the start time of the switching to the sleep mode and the cancellation time of the sleep mode. In the registration of sleep-cancelling events, which will be described later, when a time-specified print job, a time-specified sleep request, or the like, is input from a PC, the controller 60 registers, in the sleep-cancelling event schedule table, the name of the sleep-cancelling event in association with the corresponding cancellation time.

The "frequent-use period" is a period in which the total number of pints in the hourly usage history table is greater than the threshold (e.g. 100 prints). In the registration of sleep-cancelling events, which will be described later, when the power source unit 700 is powered on, the controller 60 refers to the hourly usage history table which has been created, and determines whether there is any period exceeding the threshold. If there is such a period, the controller 60 registers the start time of the period into the sleep-cancelling event schedule table, as the cancellation time of the sleep mode. FIG. 8 is a specific example of a sleep-cancelling event schedule table.

The "sleep schedule table" is a table showing the start times of the switching to the sleep mode specified by the time-specified sleep requests. When a time-specified sleep request is input from a PC or the operation panel 30, the controller 60 records the start time of the switching to the sleep mode into the sleep schedule table, and deletes the start time from the sleep schedule table when the time has been reached.

3. Registration of Sleep-Cancelling Event

Figure 9:
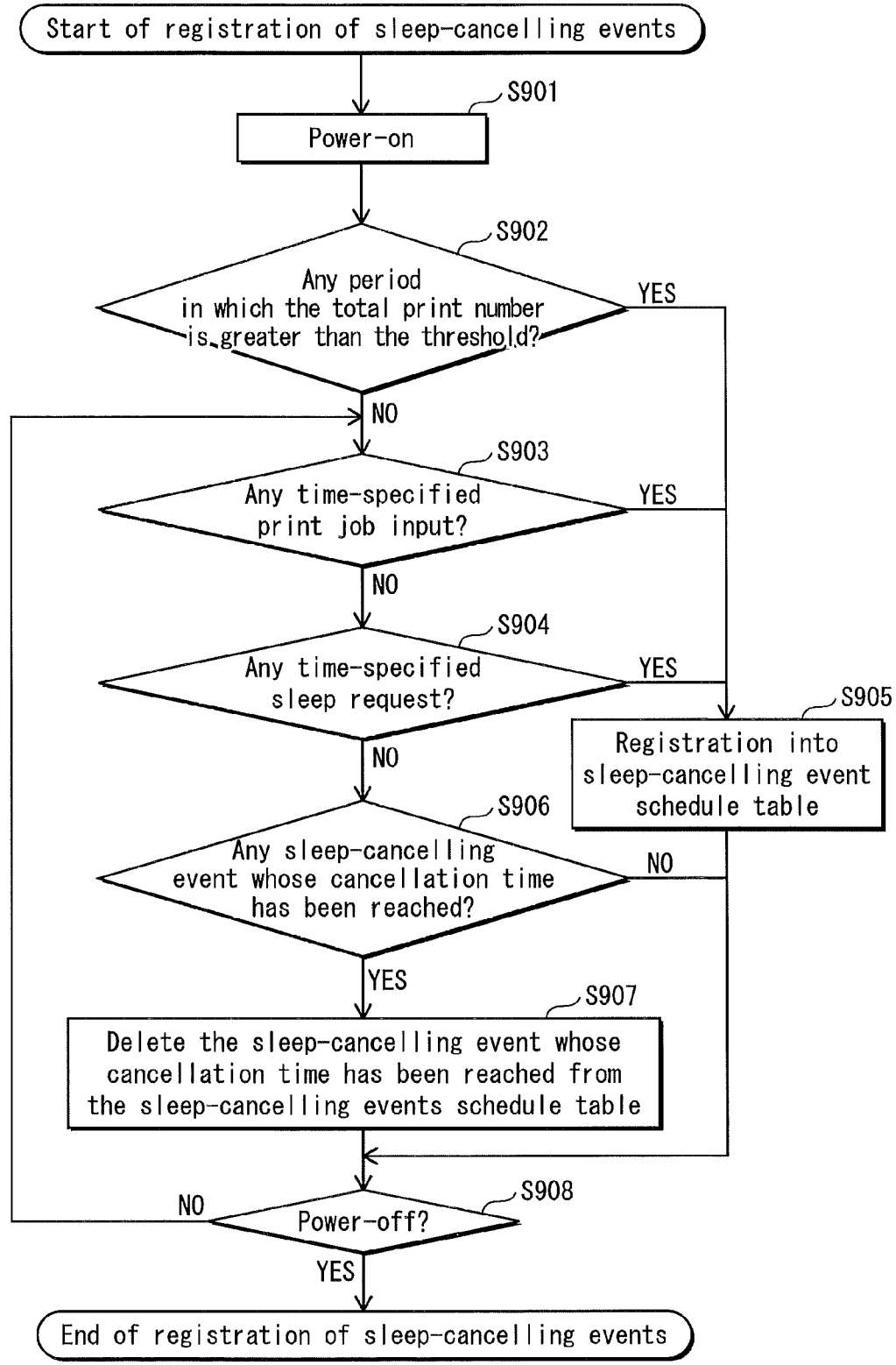
FIG. 9 is a flowchart showing operations for registration of sleep-cancelling events, performed by a controller 60.

FIG. 9 is a flowchart showing operations for the registration of sleep-cancelling events, performed by the controller 60. The registration of sleep-cancelling events is performed in parallel with the sleep trigger control, which will be descried later.

When the power source unit 700 is powered on (Step S901), the controller 60 creates the hourly usage history table, and refers to the created hourly usage history table to determine whether there is any period in which the total print number is greater than the threshold (Step S902). If there is such a period (Step S902: YES), the controller 60 registers the start time of the period into the sleep-cancelling event schedule table, as the cancellation time of the sleep mode (Step S905).

The controller 60, when a time-specified print job is input from a PC (Step S903: YES), registers the print start time specified by the time-specified print job into the sleep-cancelling event schedule table, as the cancellation time of the sleep mode (Step S905). When a time-specified sleep request is input from a PC or the operation panel 30 (Step S904: YES), the controller 60 registers the cancellation time specified by the request into the sleep-cancelling event schedule table, as the cancellation time of the sleep mode (Step S905).

If the results of the determinations performed in Step S902, Step S903 and Step S904 are all negative (Step S902: NO, Step S903: NO, Step S904: NO), the controller 60 refers to the sleep-cancelling event schedule table, and determines whether there is any sleep-cancelling event whose cancellation time has been reached (i.e. whose cancellation time is earlier than the current time) (Step S906). If there is such a sleep-cancelling event (Step S906: YES), the controller 60 deletes the sleep-cancelling event from the sleep-cancelling event schedule table (Step S907). The controller 60 repeats Step S903 to Step S907 until receiving a power-off instruction (Step S908: YES) to power off the secondary power source 702 of the power source unit 700.

4. Sleep Trigger Control

Figure 10:
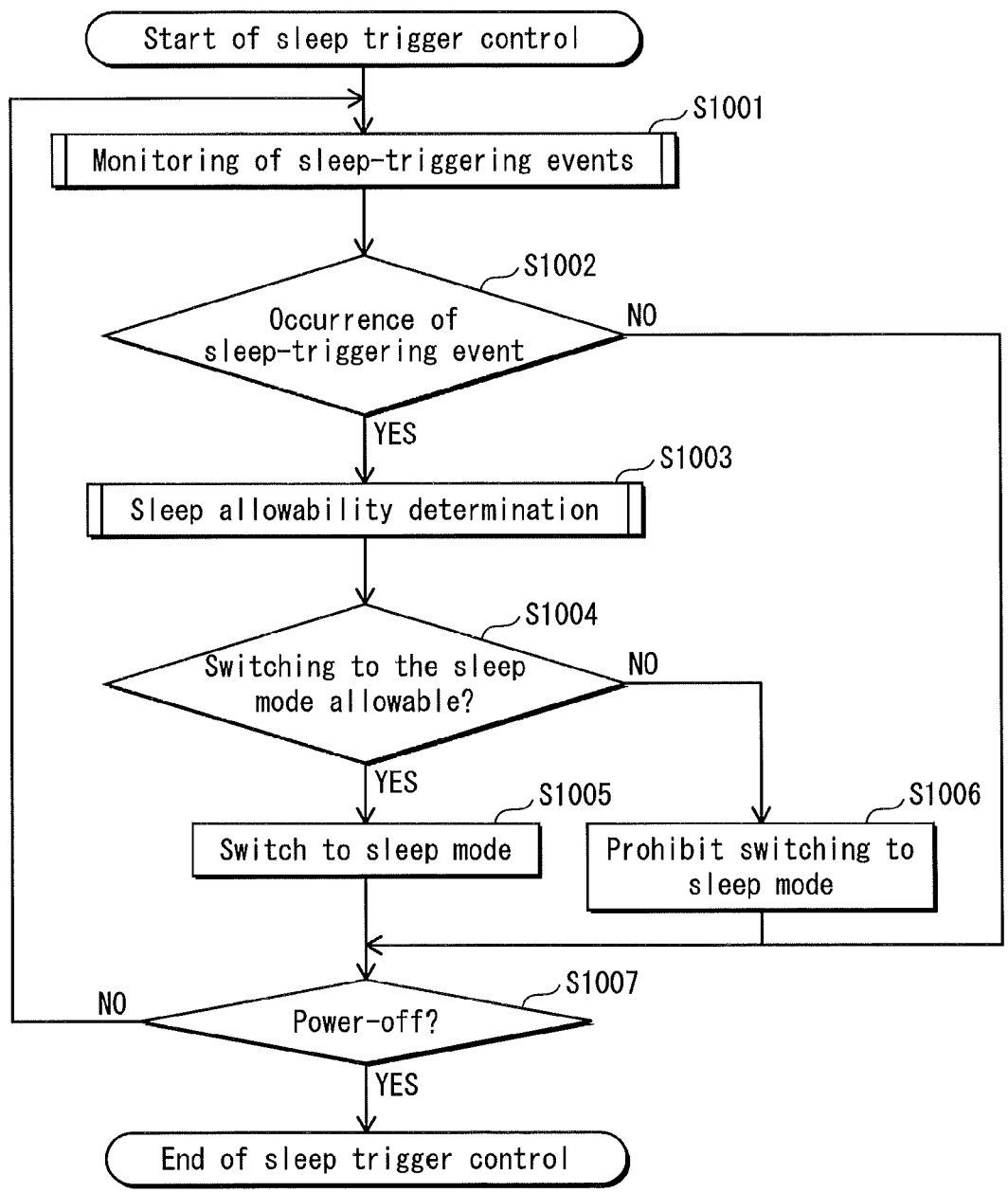
FIG. 10 is a flowchart showing operations for sleep trigger control performed by the controller 60.

FIG. 10 is a flowchart showing operations for the sleep trigger control performed by the controller 60. When the power source unit 700 is powered on, the controller 60 supplies power to the printer section 10 via the power source controller 606 to start warming up the fixing device 13, and raises the surface temperature of the fixing roller to the standby temperature. After switching the image forming apparatus 100 to the standby mode, the controller 60 monitors sleep-triggering events (Step S1001), which will be described later.

If it is determined that a sleep-triggering event that requests for switching to the sleep mode has occurred (Step S1002: YES), the controller 60 performs the Sleep-allowability determination (Step S1003), which will be described later. If it is determined in Step S1003 that switching to the sleep mode is allowable (Step S1004: YES), the controller 60 causes the power source controller 606 to stop power supply to the printer section 10, switches the image forming apparatus 100 to the sleep mode (Step S1005), and determines whether an instruction to power off the secondary power source 702 of the power source unit 700 has been received (Step S1007).

On the other hand, if it is determined in Step S1003 that switching to the sleep mode is not allowable (Step S1004: NO), the controller 60 prohibits the switching to the sleep mode (Step S1006), and moves to Step S1007.

If it is determined in Step S1002 that no sleep-triggering event has occurred (Step S1002: NO), the controller 60 moves to Step S1007. The controller 60 repeats Step S1001 to Step S1006 until it is determined in the affirmative in Step S1007 (Step S1007: YES).

Figure 11:
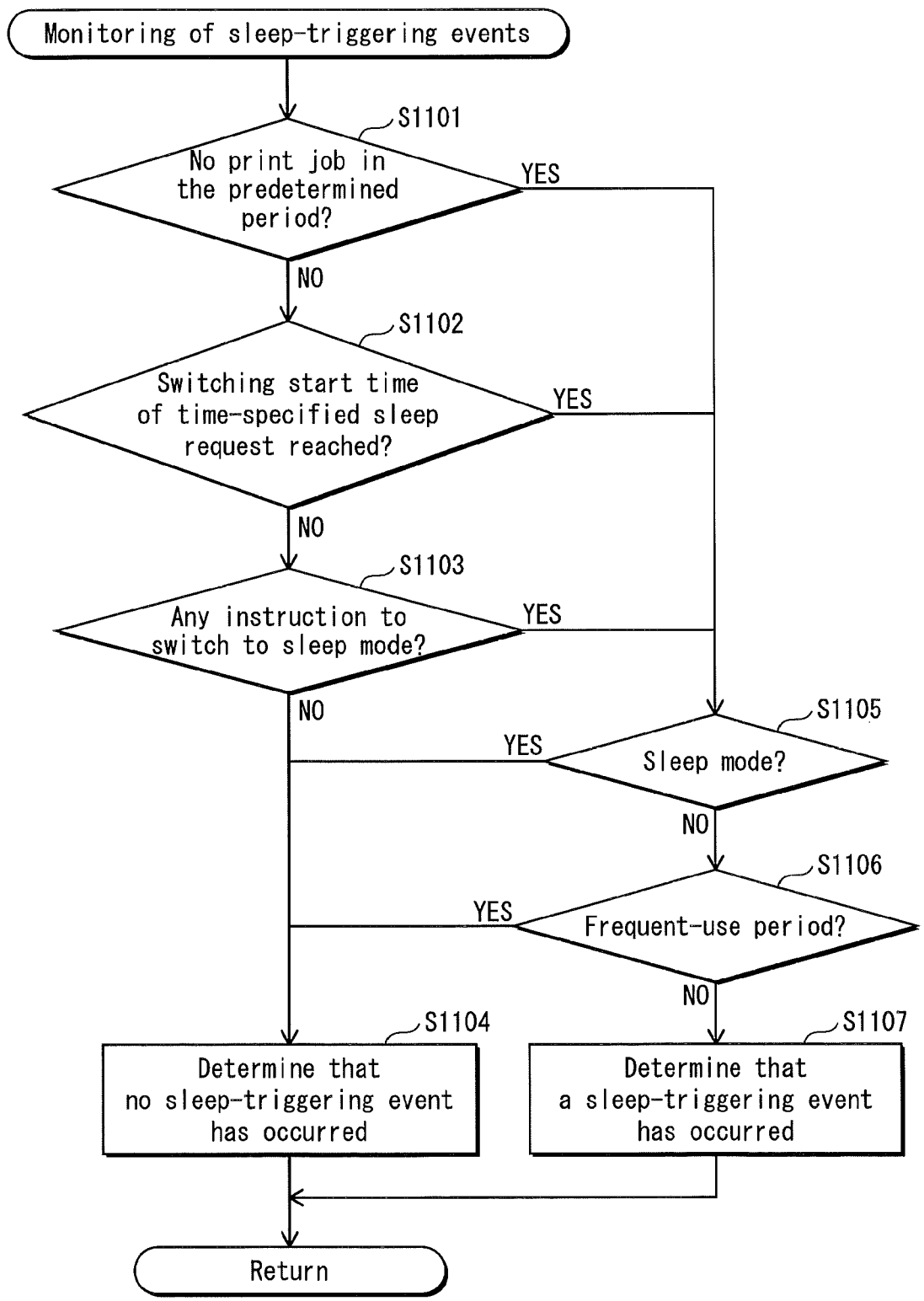
FIG. 11 is a flowchart showing operations for monitoring of sleep-triggering events, performed by a controller 60.

Next, the following describes the monitoring of sleep-triggering events, performed by the controller 60. FIG. 11 is a flowchart showing the operations therefor. The controller 60 determines: whether no print job has been input in a predetermined period (e.g. 30 minutes) after the image forming apparatus 100 switches to the standby mode; whether the switching start time corresponding to a time-specified sleep request recorded in the sleep schedule table has been reached; and whether a sleep mode instruction to switch to the sleep mode has been input from a PC or the operation panel 30 (Step S1101-Step S1103). If the results are all negative (Step S1101: NO, Step S1102: NO, Step S1103: NO), the controller 60 determines that no sleep-triggering event has occurred (Step S1104).

On the other hand, if any of the results of Step S1101-Step S1103 are affirmative (Step S1101: YES, or Step S1102: YES, or Step S1103, YES), and the image forming apparatus 100 is not in the sleep mode at the time when the determination is made (Step S1105: NO), and the time when the determination is made is not in the frequent-use period (Step S1106: NO), the controller 60 determines that a sleep-triggering event has occurred (Step S1107). If either of the results of Step S1105 or Step S1106 are affirmative (Step S1105: YES or Step S1106: YES), the controller 60 determines that a sleep-triggering event has not occurred (Step S1104).

Figure 12:
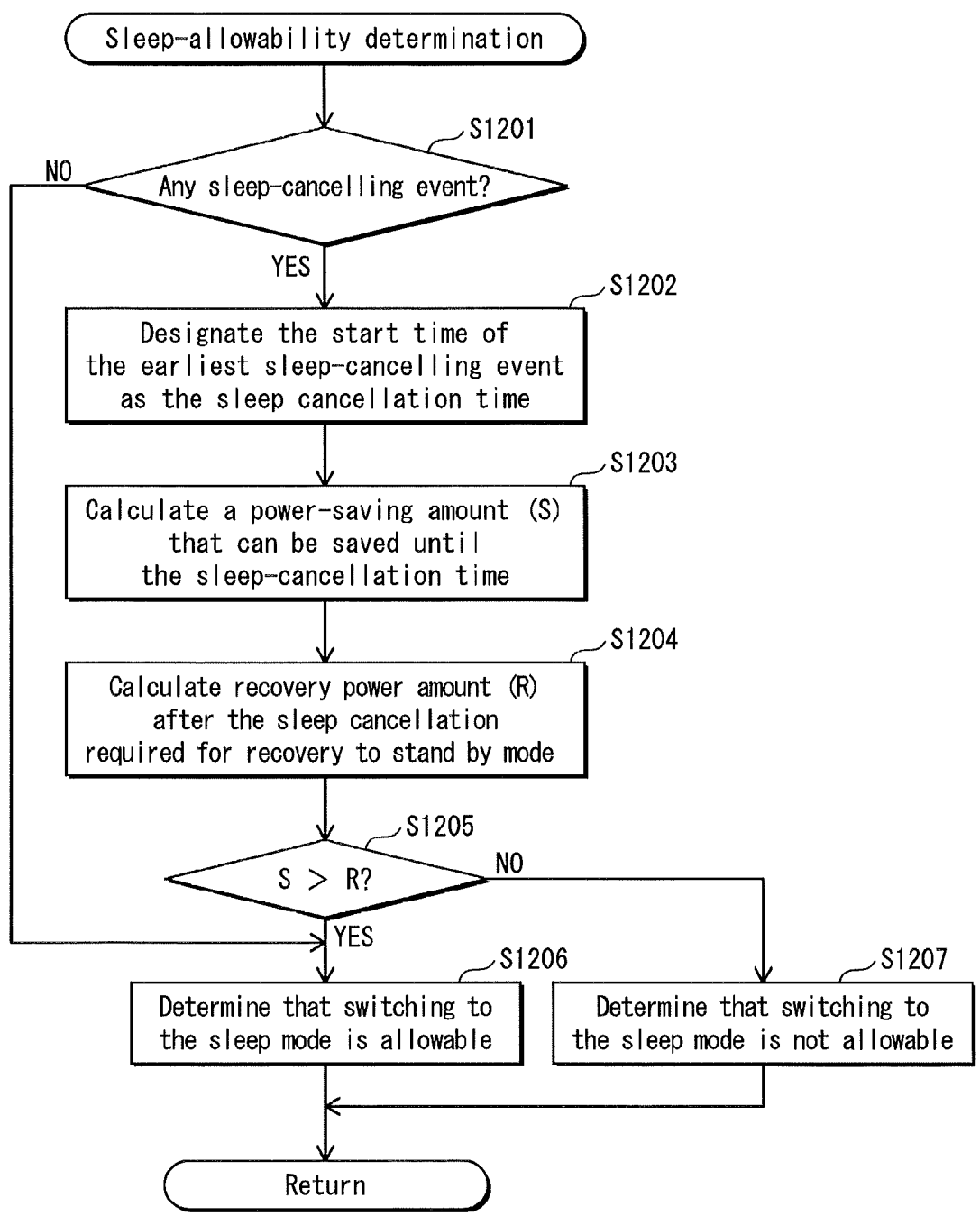
FIG. 12 is a flowchart showing operations for Sleep-allowability determination performed by the controller 60.

Next, the following describes the Sleep-allowability determination, performed by the controller 60. FIG. 12 is a flowchart showing the operations therefor.

If a sleep-triggering event has occurred (Step S1002: YES), the controller 60 refers to the sleep-cancelling event schedule table, and determines whether any sleep-cancelling events whose cancellation times are later than the current time are recorded in the sleep-cancelling event schedule table (Step S1201).

If such sleep-cancelling events are recorded (Step S1201: YES), the controller 60 designates the earliest cancellation time as the sleep-cancellation time relating to the sleep-triggering event that has occurred (Step S1202), and calculates a power-saving amount (S) that can be saved from the current time to the designated cancellation time (Step S1203).

The power-saving amount (S) is calculated in the following manner. The controller 60 acquires the current environmental temperature from the temperature sensor 40, refers to the average power consumption table stored in the table storage 607, and specifies the average power consumption corresponding to the acquired environmental temperature. Then, the controller 60 obtains the power-saving amount by multiplying the specified average power consumption by the time from the current time to the specified sleep-cancellation time.

Furthermore, the controller 60 calculates recovery power consumption (R) that is required to return the image forming apparatus 100 from the sleep mode to the standby mode, assuming that the controller 60 switches the image forming apparatus 100 to the sleep mode according to the sleep-triggering event that has occurred and cancel the sleep mode at the specified sleep-cancellation time (Step S1204). The recovery power amount (R) is calculated in the following manner. The controller 60 refers to the after-sleep temperature estimation table stored in the table storage 607, and specifies the estimated surface temperature of the fixing roller corresponding to the time from the current time to the specified sleep-cancellation time. Furthermore, the controller 60 refers to the temperature-raise power consumption table and designates the power consumption corresponding to the specified estimated surface temperature as the power consumption required to raise the specified estimated surface temperature to the standby temperature.

The controller 60 obtains the recovery power amount (R) by adding, to the specified power consumption, the power consumption required for the initial operations and cleaning operations performed by the printer section 10 when the image forming apparatus 100 is switched to the standby mode. Since this power consumption by the printer section 10 is almost constant, assume that it has been determined in advance by the manufacturer of the image forming apparatus 100 and has been stored in the table storage 607. If the Obtained power-saving amount (S) is greater than the obtained recovery power amount (R) (Step S1205: YES), the controller 60 determines that switching to the sleep mode is allowable (Step S1206). If not (Step S1205: NO), the controller 60 determines that switching to the sleep mode is not allowable (Step S1207).

As described above, when a sleep-triggering event occurs, switching to the sleep mode is performed only when the power-saving amount is greater than the recovery power amount and a power-saving effect can be produced. Therefore, it is effectively prevented that switching to the sleep mode is performed even when a power-saving effect can not be produced and that extra power will be consumed for the recovery from the sleep mode.

Modifications

The present invention has been described above, based on Embodiment. However, the present invention is not limited to Embodiment. The following modifications are acceptable.

Figure 13:
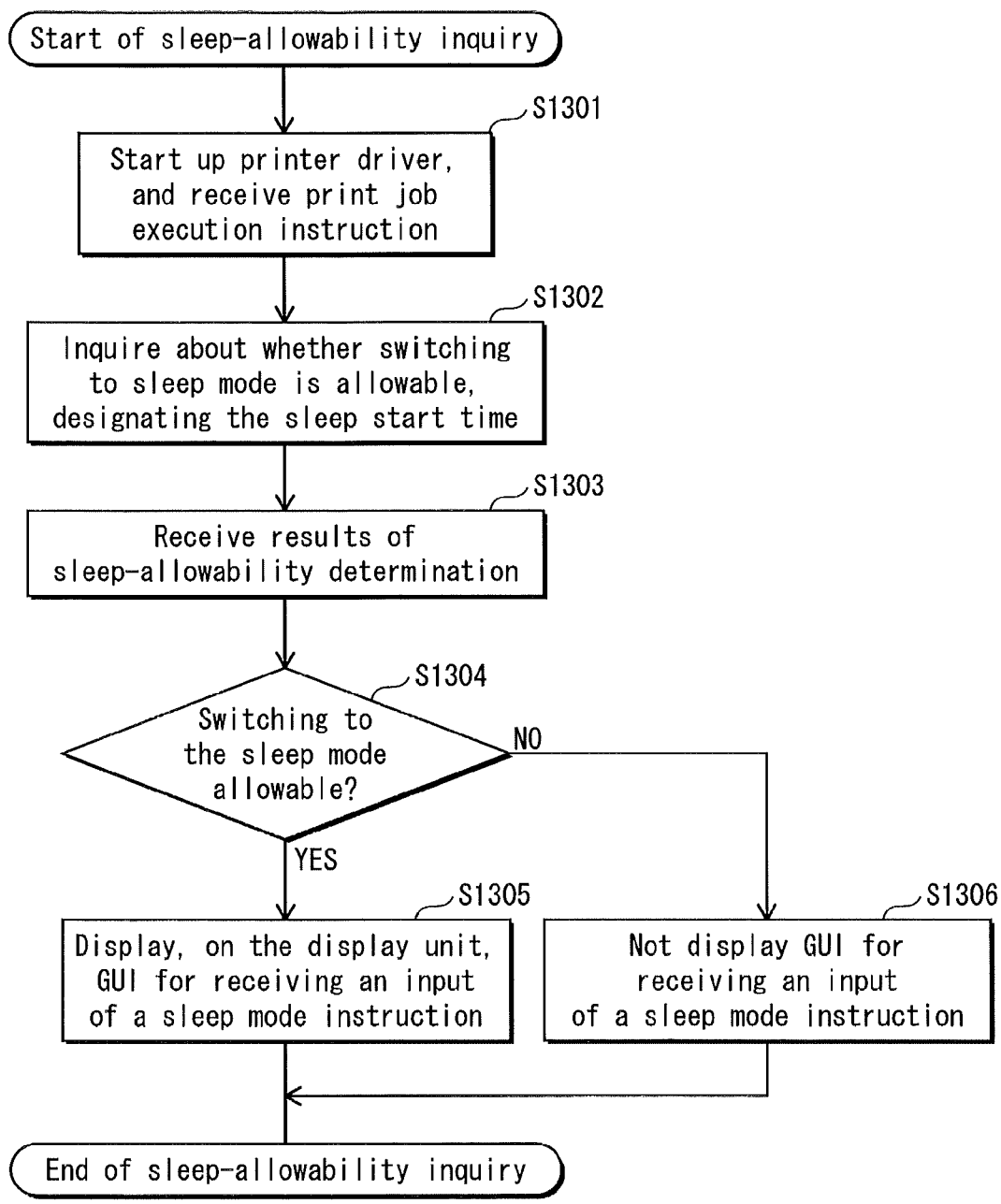
FIG. 13 is a flowchart showing operations for Sleep-allowability inquiry performed by a PC.

(1) In Embodiment, the Sleep-allowability determination is performed when a sleep-triggering event occurs. However, before a sleep-triggering event occurs, the image forming apparatus 100 may be inquired by a PC 100 as to whether switching to the sleep mode can be performed, the PC may determine whether to accept a sleep request, based on the results of the inquiry. Specifically, Sleep-allowability inquiry as shown in FIG. 13 may be performed. The PC starts up the printer driver according to an instruction from the user, and when receiving a job execution instruction from the user (Step S1301), the PC estimates the end time of the print job (i.e. a predetermined time (e.g. one minutes) later than the time when the execution instruction is received). The PC communicates with the image forming apparatus 100, and inquires the image forming apparatus 100 as to whether the switching to the sleep mode after the print job has been completed is allowable, designating the estimated end time of the print job as the sleep start time (Step S1302).

The image forming apparatus 100, which has received the inquiry, performs the same operations as the sleep availability determination shown in FIG. 12 to determine whether the switching to the sleep mode is allowable, based on the designated sleep start time, and transmits the determination results to the PC.

The PC receives the determination results from the image forming apparatus 100 (Step S1303). When the results indicate that switching to the sleep mode is allowable (Step S1304: YES), the PC displays, on a display unit, a GUI (Graphic User Interface) for receiving an input of a sleep mode instruction (Step S1305). When the results indicate that switching to the sleep mode is not allowable, the PC does not display the GUI (Step S1306). Instead of not displaying the GUI, the PC may perform control for invalidating the input of the sleep mode instruction.

If this is the case, control is performed such that the input of the sleep mode instruction will not be accepted when the power-saving effect can not be expected. Consequently, the image forming apparatus 100 is capable of avoiding uselessly accepting a sleep mode instruction from the user. From the user's viewpoint, the user can avoid uselessly making a sleep mode instruction, and can make a sleep mode instruction only when the power-saving effect can be expected. This improves the user's convenience.

(2) In Embodiment, the Sleep-allowability determination is performed when a sleep-triggering event occurs. However, the same processing as the Sleep-allowability determination may be performed when a sleep-cancelling event occurs as well in order to determine whether to cancel the sleep mode. If this is the case, the sleep mode is cancelled only when the power-saving effect can be expected. When the power-saving effect can not be expected, the PC may determine whether to cancel the sleep mode according to the instruction from the user.

Figure 14:
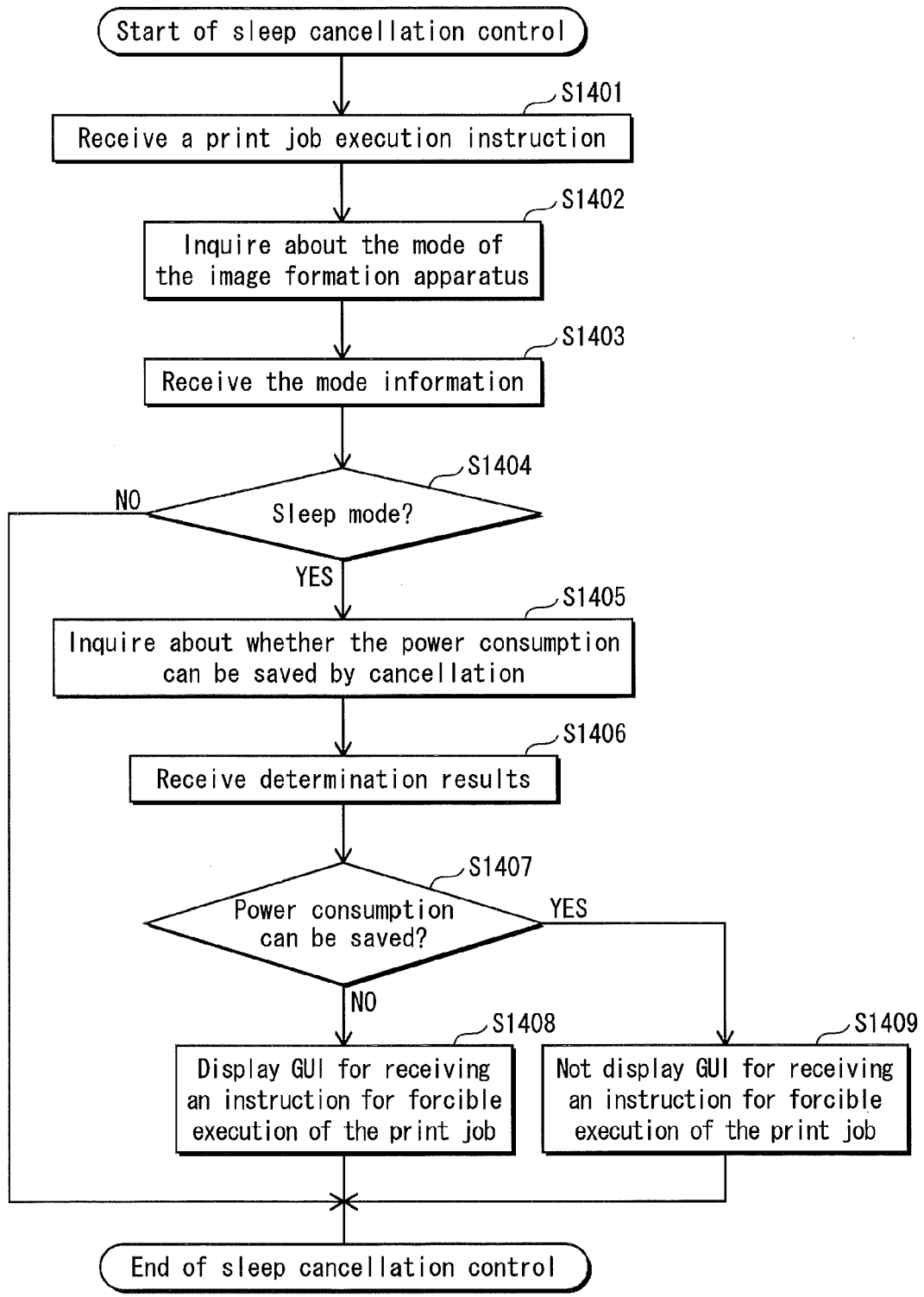
FIG. 14 is a flowchart showing operations for sleep cancellation control performed by a PC.

Specifically, sleep cancellation control as shown in FIG. 14 may be performed. The PC starts up the printer driver according to the instruction from the user. When receiving a print job execution instruction from the user (Step S1401), the PC communicates with the image forming apparatus 100 to inquire as to the mode of the image forming apparatus 100 (Step S1402). Upon receiving mode information, which indicates whether the image forming apparatus 100 is in the sleep mode or not, from the image forming apparatus 100 (Step S1403), the PC determines whether the image forming apparatus 100 is in the sleep mode or not according to the received mode information (Step S1404). If it is determined that the image forming apparatus 100 is in the sleep mode (Step S1404: YES), the PC inquires of the image forming apparatus 100 as to whether the power consumption can be saved even if the sleep mode is cancelled (Step S1405).

The image forming apparatus 100, which has received the inquiry, designates the time when the image forming apparatus 100 has received the inquiry, as the sleep-cancellation time. Using the start time of the ongoing sleep mode (Assume that this start time is stored in the image forming apparatus 100 when the sleep mode is started) as the current time, Step S1203-Step S1205 shown in FIG. 12 are performed (by which the power saving amount (S) and the recovery power amount are calculated). The image forming apparatus 100 determines it possible to save the power consumption when the obtained power-saving amount (S) is greater than the obtained recovery power amount (R) (Step S1205: YES). If not (Step S1205: NO), the image forming apparatus 100 determines it impossible to save the power consumption. The image forming apparatus 100 transmits the determination results to the PC. When the results indicate that the power consumption can be saved, the image forming apparatus 100 cancels the ongoing sleep mode.

The PC receives the determination results from the image forming apparatus 100 (Step S1406). If the results indicate that the power consumption can not be saved (Step S1407: NO), the PC displays a GUI for receiving an instruction to forcibly execute the print job (Step S1408). If the results indicate that the power consumption can be saved (Step S1407: YES), the PC does not display the GUI (Step S1409).

In Step S1409, instead of not displaying the GUI, the PC may perform control for invalidating the input indicating whether to forcibly execute the print job. Also, in addition to displaying a GUI in Step S1408, the PC may display a massage showing the reason (e.g. "If printing is executed now, there will be no power saving effect.").

If this is the case, when there will be no power saving effect if the sleep mode is cancelled, an instruction as to whether to cancel the sleep mode can be received from the user. Thus, the image forming apparatus 100 is capable of determining whether to cancel the sleep mode according to the user's wish.

(3) In the modification shown in (2), the PC may communicate with the image forming apparatus 100 and inquire as to the mode of the image forming apparatus 100 when starting up the printer driver, and display a GUI for receiving an instruction as to whether to continue the sleep mode or not only when the image forming apparatus 100 is in the sleep mode. Also, in addition to displaying the GUI, the PC may display a GUI for receiving an instruction as to whether to execute a time-specified print job.

If this is the case, if the image forming apparatus 100 is in the sleep mode, the user can be aware of that before inputting a print instruction via the screen displayed by the print driver to receive a print instruction. Consequently, the user can determine whether to continue the sleep mode at an appropriate timing, and input an instruction appropriately. Also, when making the inquiry, in the same manner as with (2), the PC may request the image forming apparatus 100 to determine whether the power consumption can be saved, and display the GUI for receiving an instruction as to whether to continue the sleep mode only when the image forming apparatus 100 is in the sleep mode and it is determined that the power consumption can be saved. If this is the case, it is possible to prevent the user from making a sleep cancellation instruction at a timing with which no power-saving effect can be produced. Thus, the PC can receive a sleep cancellation instruction from the user at an appropriate time with which the power saving effect can be produced.

(4) In Embodiment above, the power supply to the printer section 10 is stopped while the image forming apparatus 100 is in the sleep mode. However, the power supply may not be stopped, and, instead, a power at a low level (i.e. a power at a lower level than the power supplied in the standby mode) may be supplied. Even in this case, the power consumption can be reduced during the period in which the image forming apparatus 100 is not in use (i.e. the period in which the image forming apparatus 100 is in the sleep mode and there is no input of a print instruction).

(5) In Embodiment, sleep trigger control performed by an image forming apparatus is described based on an example case in which the image forming apparatus 100 is connected to a PC via a network (LAN). However, the image forming apparatus 100 may not be connected to a network, and may perform the same processing as the sleep trigger control pertaining to Embodiment.

(6) In Embodiment, the average power consumption table, the after-sleep temperature estimation table and the temperature-raise power consumption table are stored in the table storage 607, and the average power consumption used for calculating the power-saving amount (S) and the estimated surface temperature and the power consumption corresponding to the estimated surface temperature, used for calculating the recovery power amount (R), are specified by using the tables. However, instead of the tables, equations (mathematical expressions) showing the relationships indicated by the tables may be stored in the table storage 607, and the average power consumption used for calculating the power-saving amount (S) and the estimated surface temperature and the power consumption corresponding to the estimated surface temperature, used for calculating the recovery power amount (R), may be calculated by using the equations. The equations may be obtained based on the values indicated by the tables, for example.

5. Summary

One aspect of the present invention disclosed above is an image forming apparatus comprising: a monitoring part monitoring occurrence of sleep-cancelling events, each sleep-cancelling event requesting cancellation of a sleep mode and recovery to a standby mode and specifying a sleep-cancellation time at which the sleep mode is to be cancelled, the sleep mode being a mode in which an image formation operation is not executable, and the standby mode being a mode in which the image formation operation is executable; a storage part, when a sleep-cancelling event occurs, storing an identifier of the sleep-cancelling event and a sleep-cancellation time specified by the sleep-cancelling event; a calculation part, when (i) a sleep-triggering event specifying a start time at which the sleep mode is to be started occurs while the image forming apparatus is in the standby mode and (ii) one or more sleep-cancelling events specifying sleep-cancellation times later than the start time have been stored in the storage part, calculating an amount of power consumption required to maintain the standby mode for a period from the start time to the earliest one of the sleep-cancellation times, thereby obtaining a power-saving amount savable during the period, and calculating a recovery power amount required for recovery from the sleep mode to the standby mode on an assumption that the sleep mode is started at the start time and is cancelled at the earliest sleep-cancellation time; and a mode controller switching the image forming apparatus to the sleep mode if the power-saving amount is greater than the recovery power amount, and maintaining the standby mode if the power-saving amount is not greater than the recovery power amount.

The calculation part may include: a thermometer measuring an environmental temperature within the image forming apparatus; a power consumption storage part storing information showing relationships between environmental temperatures and amounts of power consumption per unit time required to maintain the standby mode, in one-to-one correspondence; a power-saving amount calculator determining an amount of power consumption corresponding to the environmental temperature at the start time by referring to the information stored in the power consumption storage part, and calculating a power-saving amount savable during a period from the start time to the earliest sleep-cancellation time according to the amount of power consumption determined thereby; a temperature storage part storing information showing relationships between times elapsed since the start time and temperatures of a fixing device, in one-to-one correspondence; an estimation part estimating a temperature of the fixing device at the earliest sleep-cancellation time according to a time elapsed since the start time until the earliest sleep-cancellation time and the information stored in the temperature storage part; a temperature-raise power consumption storage part storing information showing relationships between temperatures of the fixing device and amounts of power consumption respectively required to raise the temperatures to a standby temperature of the fixing device, in one-to-one correspondence; and a recovery power amount calculator determining an amount of power consumption corresponding to the temperature estimated by the estimation part by referring to the information stored in the temperature-raise power consumption storage part, and calculating the recovery power amount based on the amount of power consumption determined thereby.

The sleep-cancelling events may include at least one of (i) receipt of a time-specified print job specifying a print start time as the sleep-cancellation time, (ii) receipt of specification of a sleep-cancellation time, and (iii) receipt of specification of a period in which switching to the sleep mode is prohibited.

Another aspect of the present invention is a print system comprising: a terminal device; and an image forming apparatus connected to the terminal device via a network, wherein the image forming apparatus includes: a receiver receiving a sleep request from the terminal device, the sleep request specifying a start time of switching from a standby mode to a sleep mode, the standby mode being a mode in which the image formation operation is executable, and the sleep mode being a mode in which an image formation operation is not executable; a monitoring part monitoring occurrence of sleep-cancelling events, each sleep-cancelling event requesting for cancellation of the sleep mode and recovery to the standby mode; a storage part, when a sleep-cancelling event occurs, storing an identifier of the sleep-cancelling event and a sleep-cancellation time specified by the sleep-cancelling event; a calculation part, when (i) the receiver receives the sleep request while the image forming apparatus is in the standby mode and (ii) one or more sleep-cancelling events specifying sleep-cancellation times later than the start time have been stored in the storage part, calculating an amount of power consumption required to maintain the standby mode for a period from the start time to the earliest one of the sleep-cancellation times, thereby obtaining a power-saving amount savable during the period, and calculating a recovery power amount required for recovery from the sleep mode to the standby mode on an assumption that the sleep mode is started at the start time and is cancelled at the earliest sleep-cancellation time; and a mode controller switching the image forming apparatus to the sleep mode if the power-saving amount is greater than the recovery power amount, and maintaining the standby mode if the power-saving amount is not greater than the recovery power amount.

With the stated structure, the power-saving amount savable during a period from the sleep start time to the sleep-cancellation time and the recovery power amount required for recovery from the sleep mode to the standby mode are calculated, and control is performed such that switching to the sleep mode is allowed only when the power-saving amount is greater than the recovery power amount. This effectively prevents switching to the sleep mode in the case where it is expected that no power-saving effect will be produced.

Here, the image forming apparatus may further comprise: a receiver receiving a sleep cancellation request while the image forming apparatus is in the sleep mode, wherein the calculation part may calculate the power-saving amount savable during the period from a start time of the ongoing sleep mode to a time at which the receiver receives the sleep cancellation request, and calculates the recovery power amount required for recovery from the sleep mode to the standby mode on an assumption that the sleep mode is cancelled at the time at which the receiver receives the sleep cancellation request, and the mode controller may cancel the sleep mode and switches the image forming apparatus to the standby mode when the power-saving amount is greater than the recovery power amount.

With the stated structure, if there is a sleep cancellation request while the image forming apparatus is in the sleep mode, the power-saving amount savable during the period from the sleep start time of the ongoing sleep mode to a time at which the sleep cancellation request is received, and the recovery power amount required for recovery from the sleep mode to the standby mode on the assumption that the sleep mode is cancelled at the time at which the sleep cancellation request is received are calculated. The sleep mode is cancelled when the power-saving amount is greater than the recovery power amount. Thus, the sleep mode is cancelled when it is expected that power-saving effect will be produced.

In the print system, the receiver may further receive, from the terminal device, an inquiry as to whether switching to the sleep mode is allowable at a start time specified by the inquiry, the calculation part, when (i) the receiver receives the inquiry and (ii) one or more sleep-cancelling events specifying sleep-cancellation times later than the start time specified by the inquiry have been stored in the storage part, may calculate an amount of power consumption required to maintain the standby mode for a period from the start time to the earliest one of the sleep-cancellation times, thereby obtaining a power-saving amount savable during the period, and calculate a recovery power amount required for recovery from the sleep mode to the standby mode on an assumption that the sleep mode is started at the start time and is cancelled at the earliest sleep-cancellation time, and the image forming apparatus may include: a determination part determining that switching to the sleep mode is allowable if the power-saving amount is greater than the recovery power amount, and determining that switching to the sleep mode is not allowable if the power-saving amount is not greater than the recovery power amount; and a notification part notifying the terminal device of results of the determination by the determination part, and the terminal device may accept the sleep request only when the determination part determines that switching to the sleep mode is allowable.

With the stated structure, before receiving an instruction to switch to the sleep mode from the user, the image forming apparatus is inquired as to whether the switching to the sleep mode is allowable, and the image forming apparatus performs control such that the instruction will be accepted only when the switching is allowable. Thus, the image forming apparatus 100 is capable of avoiding uselessly accepting the sleep mode instruction from the user. From the user's viewpoint, the user can avoid uselessly making a sleep mode instruction. This improves the user's convenience.

In the print system, the terminal device may includes: an inquiry part inquiring of the image forming apparatus as to whether the image forming apparatus is in the sleep mode; and a display controller, when the image forming apparatus is in the sleep mode, displaying a screen for receiving an instruction as to whether to continue the sleep mode. With the stated structure, a screen for receiving an instruction as to whether to continue the sleep mode is displayed by the terminal device when the image forming apparatus is in the sleep mode. The user can determine whether to continue the sleep mode at an appropriate timing, and input an instruction appropriately, via the screen.

In the print system, the receiver may further receive a sleep cancellation request from the terminal device, the calculation part may calculate the power-saving amount savable during a period from a start time of the ongoing sleep mode to a time at which the receiver receives the sleep cancellation request, and may calculate the recovery power amount required for recovery from the sleep mode to the standby mode on an assumption that the sleep mode is cancelled at the time at which the receiver receives the sleep cancellation request, the determination part may determine that power consumption is savable if the power-saving amount is greater than the recovery power amount, and may determine that power consumption is not savable if the power-saving amount is not greater than the recovery power amount, the notification part may notify the terminal device of results of the determination by the determination part, the mode controller may cancel the sleep mode and switches the image forming apparatus to the standby mode when the determination part determines that power consumption is savable, and the terminal device, when the determination part determines that power consumption is not savable, may display a screen for receiving an instruction as to whether to forcibly cancel the sleep mode.

With the stated structure, when a sleep cancellation request is made by the terminal device, a user's instruction as to whether to cancel the sleep mode can be received via the screen displayed by the terminal device if no power-saving effect will be produced by cancelling the sleep mode at the receipt of the sleep cancellation request. Thus, whether to cancel the sleep mode can be determined according to the user's wish.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image forming apparatus comprising:
a monitoring part monitoring occurrence of sleep-cancelling events, each sleep-cancelling event requesting cancellation of a sleep mode and recovery to a standby mode and specifying a sleep-cancellation time at which the sleep mode is to be cancelled, the sleep mode being a mode in which an image formation operation is not executable, and the standby mode being a mode in which the image formation operation is executable;
a storage part, when a sleep-cancelling event occurs, storing an identifier of the sleep-cancelling event and a sleep-cancellation time specified by the sleep-cancelling event;
a calculation part, when (i) a sleep-triggering event specifying a start time at which the sleep mode is to be started occurs while the image forming apparatus is in the standby mode and (ii) one or more sleep-cancelling events specifying sleep-cancellation times later than the start time have been stored in the storage part, calculating an amount of power consumption required to maintain the standby mode for a period from the start time to the earliest one of the sleep-cancellation times, thereby obtaining a power-saving amount savable during the period, and calculating a recovery power amount required for recovery from the sleep mode to the standby mode on an assumption that the sleep mode is started at the start time and is cancelled at the earliest sleep-cancellation time; and
a mode controller switching the image forming apparatus to the sleep mode if the power-saving amount is greater than the recovery power amount, and maintaining the standby mode if the power-saving amount is not greater than the recovery power amount,
wherein the calculation part includes:
a thermometer measuring an environmental temperature within the image forming apparatus;
a power consumption storage part storing information showing relationships between environmental temperatures and amounts of power consumption per unit time required to maintain the standby mode, in one-to-one correspondence;
a power-saving amount calculator determining an amount of power consumption corresponding to the environmental temperature at the start time by referring to the information stored in the power consumption storage part, and calculating the power-saving amount savable during a period from the start time to the earliest sleep-cancellation time according to the amount of power consumption determined thereby;
a temperature storage part storing information showing relationships between times elapsed since the start time and temperatures of a fixing device, in one-to-one correspondence;
an estimation part estimating a temperature of the fixing device at the earliest sleep-cancellation time according to a time elapsed since the start time until the earliest sleep-cancellation time and the information stored in the temperature storage part;
a temperature-raise power consumption storage part storing information showing relationships between temperatures of the fixing device and amounts of power consumption respectively required to raise the temperatures to a standby temperature of the fixing device, in one-to-one correspondence; and
a recovery power amount calculator determining an amount of power consumption corresponding to the temperature estimated by the estimation part by referring to the information stored in the temperature-raise power consumption storage part, and calculating the recovery power amount based on the amount of power consumption determined thereby.

2. The image forming apparatus of claim 1 further comprising:
a receiver receiving a sleep cancellation request while the image forming apparatus is in the sleep mode, wherein
the calculation part calculates a power-saving amount savable during the period from a start time of the ongoing sleep mode to a time at which the receiver receives the sleep cancellation request, and calculates a recovery power amount required for recovery from the sleep mode to the standby mode on an assumption that the sleep mode is cancelled at the time at which the receiver receives the sleep cancellation request, and
the mode controller cancels the sleep mode and switches the image forming apparatus to the standby mode when the power-saving amount savable during the period from the start time of the ongoing sleep mode to the time at which the receiver receives the sleep cancellation request is greater than the recovery power amount required for recovery from the sleep mode to the standby mode on the assumption that the sleep mode is cancelled at the time at which the receiver receives the sleep cancellation request.

3. The image forming apparatus of claim 1, wherein
the sleep-cancelling events include at least one of (i) receipt of a time-specified print job specifying a print start time as the sleep-cancellation time, (ii) receipt of specification of a sleep-cancellation time, and (iii) receipt of specification of a period in which switching to the sleep mode is prohibited.

4. A print system comprising:
a terminal device; and
an image forming apparatus connected to the terminal device via a network,
wherein the image forming apparatus includes:
a receiver receiving a sleep request from the terminal device, the sleep request specifying a switching start time of switching from a standby mode to a sleep mode, the standby mode being a mode in which the image formation operation is executable, and the sleep mode being a mode in which an image formation operation is not executable;
a monitoring part monitoring occurrence of sleep-cancelling events, each sleep-cancelling event requesting for cancellation of the sleep mode and recovery to the standby mode;
a storage part, when a sleep-cancelling event occurs, storing an identifier of the sleep-cancelling event and a sleep-cancellation time specified by the sleep-cancelling event;
a calculation part, when (i) the receiver receives the sleep request while the image forming apparatus is in the standby mode and (ii) one or more sleep-cancelling events specifying sleep-cancellation times later than the switching start time have been stored in the storage part, calculating an amount of power consumption required to maintain the standby mode for a period from the switching start time to the earliest one of the sleep-cancellation times, thereby obtaining a power-saving amount savable during the period, and calculating a recovery power amount required for recovery from the sleep mode to the standby mode on an assumption that the sleep mode is started at the switching start time and is cancelled at the earliest sleep-cancellation time; and a mode controller switching the image forming apparatus to the sleep mode if the power-saving amount is greater than the recovery power amount, and maintaining the standby mode if the power-saving amount is not greater than the recovery power amount, wherein:

the receiver further receives, from the terminal device, an inquiry as to whether switching to the sleep mode is allowable at an inquiry start time specified by the inquiry, the calculation part, when (i) the receiver receives the inquiry and (ii) one or more sleep-cancelling events specifying sleep-cancellation times later than the inquiry start time specified by the inquiry have been stored in the storage part, calculates an amount of power consumption required to maintain the standby mode for a period from the inquiry start time specified by the inquiry to the earliest one of the sleep-cancellation times, thereby obtaining a power-saving amount savable during the period from the inquiry start time specified by the inquiry to the earliest one of the sleep-cancellation times, and calculates a recovery power amount required for recovery from the sleep mode to the standby mode on an assumption that the sleep mode is started at the inquiry start time specified by the inquiry and is cancelled at the earliest sleep-cancellation time, and the image forming apparatus includes:

a determination part determining that switching to the sleep mode is allowable if the power-saving amount savable during the period from the inquiry start time specified by the inquiry to the earliest one of the sleep-cancellation times is greater than the recovery power amount calculated on the assumption that the sleep mode is started at the inquiry start time specified by the inquiry and is cancelled at the earliest sleep-cancellation time, and determining that switching to the sleep mode is not allowable if the power-saving amount savable during the period from the inquiry start time specified by the inquiry to the earliest one of the sleep-cancellation times is not greater than the recovery power amount calculated on the assumption that the sleep mode is started at the inquiry start time specified by the inquiry and is cancelled at the earliest sleep-cancellation time; and a notification part notifying the terminal device of results of the determination by the determination part, and the terminal device accepts a sleep mode instruction from a user only when the determination part determines that switching to the sleep mode is allowable.

5. The print system of claim 4, wherein the terminal device includes:

an inquiry part inquiring the image forming apparatus as to whether the image forming apparatus is in the sleep mode; and a display controller, when the image forming apparatus is in the sleep mode, displaying a screen for receiving an instruction as to whether to continue the sleep mode.

6. The print system of claim 4, wherein the receiver further receives a sleep cancellation request from the terminal device while the image forming apparatus is in sleep mode, the calculation part calculates a power-saving amount savable during a period from a start time of the ongoing sleep mode to a time at which the receiver receives the sleep cancellation request, and calculates a recovery power amount required for recovery from the sleep mode to the standby mode on an assumption that the sleep mode is cancelled at the time at which the receiver receives the sleep cancellation request, the determination part determines that power consumption is savable if the power-saving amount savable during the period from the start time of the ongoing sleep mode to the time at which the receiver receives the sleep cancellation request is greater than the recovery power amount required for recovery from the sleep mode to the standby mode on an assumption that the sleep mode is cancelled at the time at which the receiver receives the sleep cancellation request, and determines that power consumption is not savable if the power-saving amount savable during the period from the start time of the ongoing sleep mode to the time at which the receiver receives the sleep cancellation request is not greater than the recovery power amount required for recovery from the sleep mode to the standby mode on an assumption that the sleep mode is cancelled at the time at which the receiver receives the sleep cancellation request, the notification part notifies the terminal device of results of the determining of whether power consumption is savable or not savable by the determination part, the mode controller cancels the sleep mode and switches the image forming apparatus to the standby mode when the determination part determines that power consumption is savable, and the terminal device, when the determination part determines that power consumption is not savable, displays a screen for receiving an instruction as to whether to forcibly cancel the sleep mode.

* * * * *